March 30, 1943.    J. T. VOORHEIS    2,315,171
ADJUSTABLE CHARACTERISTIC CONTROL VALVE
Filed Sept. 30, 1940    3 Sheets-Sheet 1

INVENTOR:
JOSEPH T. VOORHEIS
BY
James M. Abbott
ATTORNEYS.

March 30, 1943.  J. T. VOORHEIS  2,315,171
ADJUSTABLE CHARACTERISTIC CONTROL VALVE
Filed Sept. 30, 1940   3 Sheets-Sheet 2

INVENTOR:
JOSEPH T. VOORHEIS,
BY James M. Abbott
ATTORNEYS.

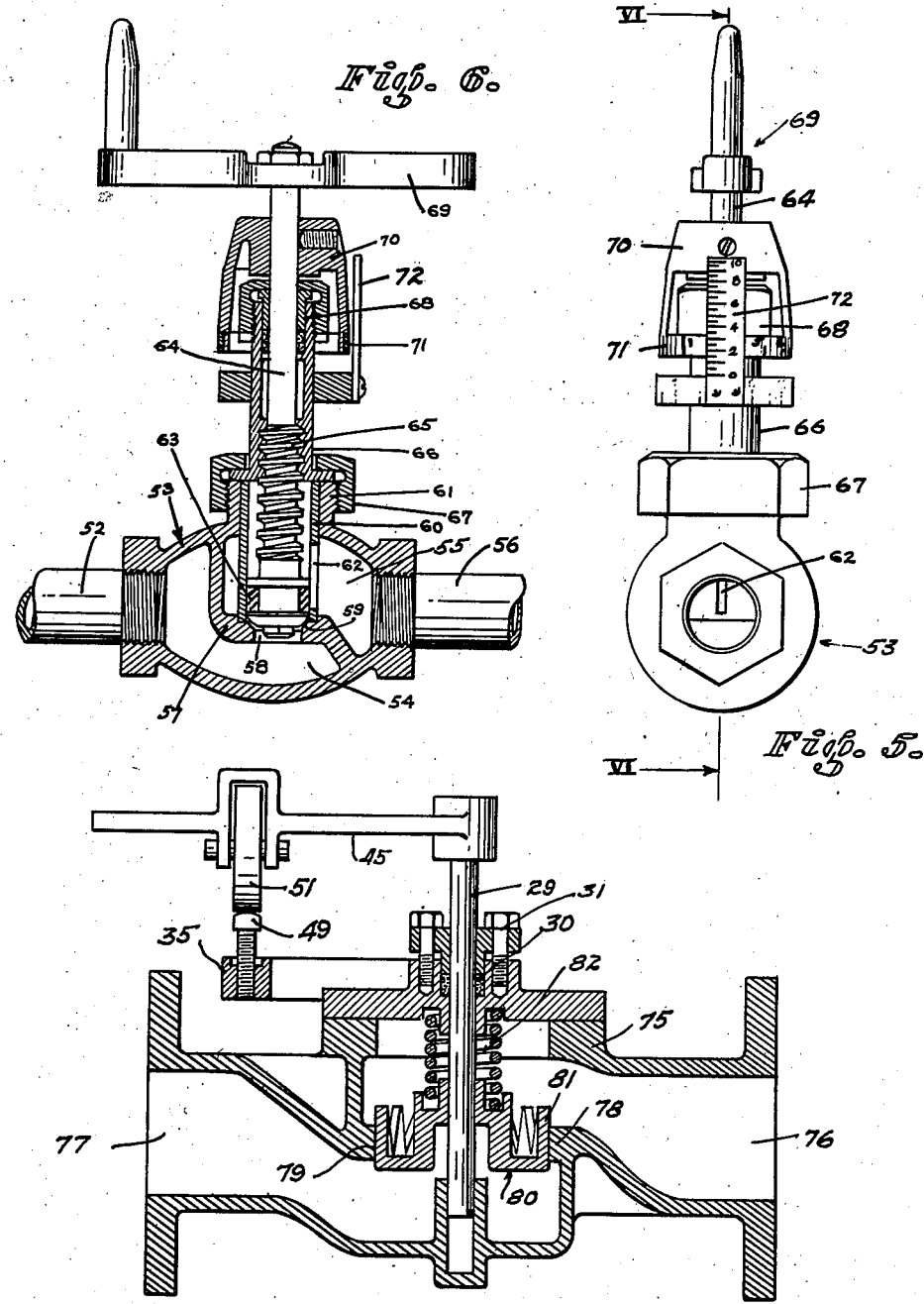

Patented Mar. 30, 1943

2,315,171

UNITED STATES PATENT OFFICE 2,315,171

ADJUSTABLE CHARACTERISTIC CONTROL VALVE

Joseph T. Voorheis, Oakland, Calif.

Application September 30, 1940, Serial No. 358,987

1 Claim. (Cl. 251—132)

This invention relates to valve structures and particularly pertains to an adjustable characteristic control valve.

In the control of fluids for various purposes, such for example as when coordinating the volumetric flow of fluid with relation to some element or structure which will determine a variation in the flow of fluid, it is desirable to provide value means by which the flow of fluid may be accurately controlled throughout a predetermined and characteristic cycle of control. An instance of such a control would be the control of fuel oil to a burner in a predetermined and adjusted relationship to the control or setting of a furnace damper, in which instance it would be desirable to coordinate the movement and control of the damper and fuel valve in a manner to obtain the best possible combustion of fuel at a particular setting of both the damper and the valve. It is the principal object of the present invention, therefore, to provide a valve structure through which the flow of a fluid may be accurately metered, and by which valve arrangement it is possible to move a valve control element through a predetermined sequence of valve settings while accurately positioning the valve to predetermined degrees of opening for definite settings without limitation due to the sequential movement of the control member. It is a further object of the invention to provide a metering valve structure in which the volume of fluid flow may be accurately determined for any predetermined setting, or changed through any sequence of settings.

The present invention contemplates the provision of a valve including a housing, a movable metering valve element therein, and a control for said metering valve element adapted to be set so that a desired position of the valve may be established at any point in a cycle of movement of the control member, and with or without progressive sequence in valve opening.

The invention is illustrated by way of example in the accompanying drawings, in which:

Fig. 5 is a view in elevation showing a form of the adjustable metering valve with progressive sequence control.

Fig. 6 is a view in central section through the valve as seen on the line 6—6 of Fig. 5.

Fig. 7 is a view in central vertical section showing another form of the invention.

Figures 1, 2:
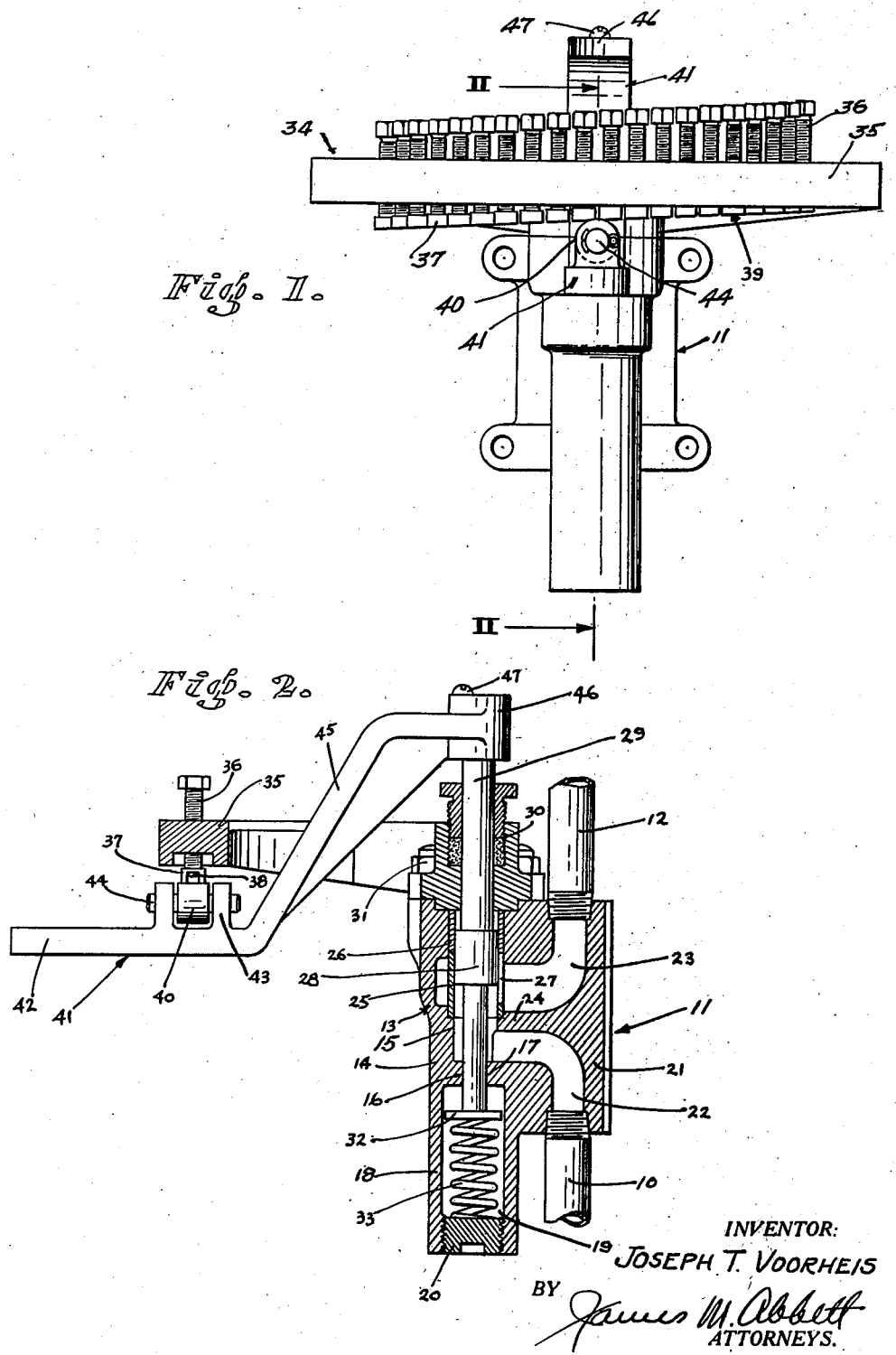
Figure 1 is a view in side elevation showing the valve structure with which the present invention is concerned.
Fig. 2 is a view in central vertical section through the valve structure as seen on the line 2—2 of Fig. 1 and discloses the details of the valve construction.

Referring more particularly to the drawings, 10 indicates an induction pipe through which a fluid may be delivered to a valve structure generally indicated at 11. An eduction pipe 12 connects to the opposite side of the valve structure 11 and conducts the fluid to a suitable point of delivery. The valve structure 11 with which the present invention is concerned is shown in Fig. 2 as including a valve housing 13. This housing has a central substantially cylindrical body portion 14 within which a bore 15 occurs. This bore extends longitudinally of the housing and continues through a web 16, where the bore is reduced, as indicated at 17. Below the web 16 is a tubular extension 18 of the housing having a spring chamber 19 longitudinally thereof. The lower end of the tubular extension is threaded to receive a plug 20. Opposite from the main body of the housing is a manifold block 21 formed with a passageway 22 therein establishing communication between the induction pipe 10 and the lower end of the bore 15. The manifold block also is formed with a passageway 23 which establishes communication between the bore 15 and the eduction pipe 12. These passageways are separated by an intermediate partition 24. The portion of the bore 15 in the housing and above the passageway 22 receives a metering valve sleeve 25 and a spacer sleeve 26. The metering valve sleeve bridges the inner end of the eduction passageway 23 and is formed with a slotted outlet port 27. This slotted outlet opening may be of any desired configuration and may for example be of varying width throughout its length. In some instances a V-shaped port is provided. Mounted within the metering valve sleeve 25 and the spacer sleeve 26 is a valve plunger 28 which is of the piston type and may be reciprocated within the sleeves to be moved from a position where it fully obstructs the port 27 to any position of partial opening of said port. The plunger 28 is carried on a valve rod 29 which extends upwardly through a stuffing gland 30 which is bolted in place by bolts 31. The lower end of the valve rod 29 extends through the opening 17 in the housing and terminates with an enlarged head 32 which rests upon an expansion spring 33. This spring is confined within the bore 19 by the plug 20 and tends to urge the valve rod and the valve plunger 28 toward their uppermost positions.

Formed integral with the stuffing box 30 is an adjusting segment 34 which includes an arcuate plate 35 of a predetermined arcuate length and being disposed concentrically with relation to the central axis of the valve rod 29. This plate carries a plurality of adjusting screws 36 which are arranged along a circle concentric with the central axis of the valve rod 29 and extend parallel to that axis. As shown in Figs. 1 and 2 of the drawings, the lower ends of each of these screws are fitted with a bearing block 37 which is substantially rectangular in shape and has a recess in it to accommodate the head of a screw 38 which extends upwardly into the adjusting screw 36. The screws 36 are close enough together to insure that the side faces of the blocks 37 will be in close proximity to each other and will, therefore, be prevented from rotating when the screws are adjusted. It will thus be seen that by an examination of Fig. 1 of the drawings that a substantially continuous track or cam face, generally indicated at 39, will be produced by the lower faces of the blocks. It will also be evident that after the various blocks have been adjusted an abrading member may be used to treat the lower faces of the blocks so that their face 39 will be regular in shape. Disposed beneath the series of bearing blocks 37 and the arcuate member 35 is a roller 40 which is carried on an operating handle 41. This operating handle comprises a horizontal portion 42 carrying bearing lugs 43 through which the pin 44 of the roller 40 is supported. An inclined portion 45 of the arm extends upwardly and then horizontally to terminate in a hub 46 which receives the upper end of the valve rod 29. The valve rod 29 is suitably secured with relation to the member 46 as by the screw 47 so that the valve rod and the arm 41 will rotate in unison. Attention is directed to the fact that the spring 33 constantly urges the valve rod 29 upwardly. This also acts to urge the portion 42 of the control arm 41 upwardly beneath the arcuate portion 35 of the segment so that at all times the roller 40 will be forced upwardly and will remain in contact with the cam surface 39 formed by the blocks 37. Thus, as the control arm 41 swings and rotates the valve rod 29 it will pass along and beneath the segment 34 and will permit the valve rod to move up and down as determined by the adjustment of the blocks 37 with relation to each other.

Figure 4:
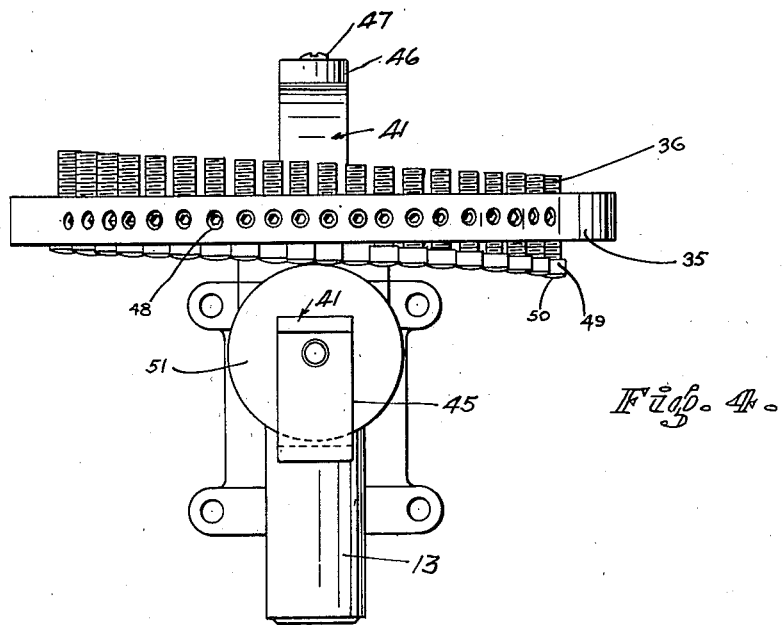
Fig. 4 is a view in elevation showing another form of the invention.

In the form of the invention shown in Fig. 4 of the drawings, the structure is slightly different in that the adjusting screws 36 extend upwardly through the plate 35 of the segment 34 and are held by headless set screws 48. The heads 49 of the adjusting screws 36 extend downwardly and have rounded surfaces 50. They contact with a relatively large roller 51 which is used in place of the roller 40 previously described, and which insures that transition of the roller 51 from contact with the head of one screw to contact with the head of the next adjacent screw will take place without sudden disturbance of the valve.

Referring particularly to Figs. 5 and 6 of the drawings, it will be seen that a variation in the structure is provided while still using the metering valve sleeve. In this particular structure a combined shut-off valve and control valve is provided. A supply pipe 52 connects with the valve housing 53. This valve housing has an inlet passageway 54 and an outlet passageway 55. The outlet passageway connects with a pipe 56. A partition 57 separates these passageways. The partition 57 is formed with an opening 58 through a valve seat 59. Resting upon the upper face of the partition is a metering valve sleeve 60 which fits within the upper threaded extension 61 of the valve housing 53. This valve sleeve has an opening 62 through it which may be of any desired configuration to control the volume of fluid which passes through it at different degrees of opening. Slidably mounted within the sleeve 60 is a valve piston 63 which is carried upon a valve stem 64. The valve stem 64 is formed with a threaded portion 65 which extends through a threaded sleeve 66. This sleeve is secured to the housing 53 by a nut 67. The upper end of the sleeve is provided with a stuffing box 68 through which the valve stem 67 extends. The upper end of the valve stem carries a handle structure 69. Mounted upon the valve stem is a hub structure 70 carrying a ring 71 upon which a circular scale is marked. A vertical scale is carried on a finger 72, thus making it possible to adjust the valve in the manner of a vernier adjustment. With this arrangement the plunger may be accurately set with relation to the port in the sleeve. Attention is directed to the fact that in this connection the port 62 in the sleeve 60 may be made of any desired configuration so that through the cycle of travel of the plunger within the valve sleeve the degree of opening of the port may change as the plunger moves without progressing in area in direct ratio of the plunger movement.

Figure 3:
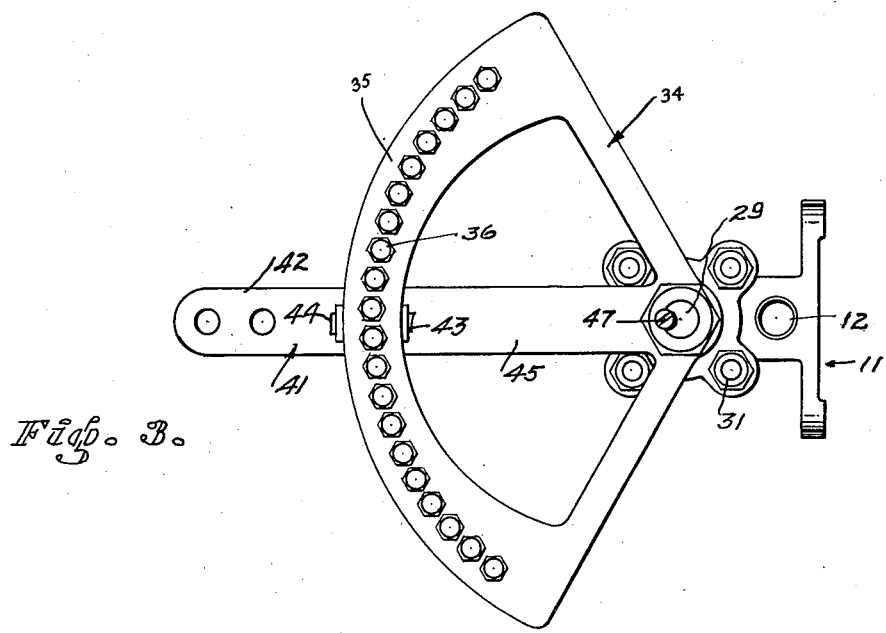
Fig. 3 is a view in plan drawn at a reduced scale showing the adjustable segment of the valve structure and its relation to the valve.

In operation of the present invention the performance of the valve structure shown in Figs. 1, 2 and 3 will first be explained. In this structure the adjusting screws 37 with their blocks 37 may be set to establish the cam face 29 to any desired pattern. For example, if the valve is to be progressively opened the screws 36 may be set so that they will project through the plate 35 for increasing distances and progressively throughout the length of the arc upon which the screws are centered. It may, however, be desirable to cause the valve to be gradually opened as the handle 41 swings from its initial position to an intermediate position, and then to gradually close as it continues to advance toward its other extreme position. It also may be desirable to progressively open or close the valve at some irregular rate, even though the valve handle moves uniformly. All such conditions may be determined by the adjustment of the screws 36. After the screws have been adjusted to form a desired cam pattern along the surface 39 the end faces of the blocks may be smoothed off with some abrading member, such as a file or grinding wheel.

It will be understood that the spring 33 continuously exerts an upward force against the lower end of the valve rod 29, tending to urge the valve plunger 28 upwardly within the valve sleeve 25 and thereby uncover the port 27. This upward movement of the valve can only take place as determined by the contour of the cam surface 39 formed by the ends of the blocks 37, and as the control lever 41 is swung in the arc of its travel the proper valve setting will be made. By reference to Fig. 4 of the drawings, it will be seen that the same sort of adjustment can be obtained by the various screws along the heads of which the roller 51 passes.

In the form of the invention shown in Figs. 5 and 6 the same type of valve sleeve and valve plunger is used as disclosed in the other views. In this particular case a vernier adjustment is obtained, since it is common to all of the structures embodying the present invention as here disclosed that the valve stem rotates while moving longitudinally. It is also possible in all types of the structure to provide interchangeable valve sleeves which may have any desired pattern of orifice opening required to produce a characteristic flow sequence.

In the form of the invention shown in Fig. 7 a different form of valve is provided, although the operating mechanism is substantially the same as that disclosed in the forms of the invention shown in Figs. 2 and 4. In this type of the device a valve housing 75 is provided having fluid passageways 76 and 77 therethrough. These passageways are separated by a wall 78 through which a valve opening 79 is formed. Slidably mounted through this opening is an inverted cup-shaped valve member 80 having a cylindrical wall 81 which slides through the bore of the valve opening 79. This wall is serrated so that fluids of certain types may be easily regulated and metered in their flow through the valve. The valve is urged downwardly into the opening 79 by a spring 82 and is lifted by the action of wheel 51 riding over the cam screws 49, as previously shown and described in Fig. 4. In this instance, however, it will be noted that the member 35 is disposed beneath the cam roller 51 and that the lever 45 is disposed upon the upper end of the valve shaft 29.

It will thus be seen that the invention here disclosed is decidedly simple in operation, that the valve is direct in its action, and that it is possible to accurately control the flow of fluid through the valve in any characteristic manner through a particular cycle of valve movement.

While I have shown the preferred form of my invention as now known to me, it will be understood that various changes may be made in combination, construction, and arrangement of parts by those skilled in the art, without departing from the spirit of my invention as claimed.

Having thus described my invention, what I claim and desire to secure by Letters Patent is:

An adjustable characteristic flow valve, comprising a valve housing including a valve chamber and inlet and outlet ports connecting therewith, a valve seat within the chamber of the housing comprising a cylindrical element having an outlet opening in the wall thereof through which communication may be established between the ports, a plunger valve element reciprocating through said valve seat and acting to vary the effective opening between the ports and through the side wall of the valve, spring means normally urging the valve to one of its extreme positions, an arcuate frame rigidly supported by the housing and disposed in a plane normal thereto, said frame being concentric with the axis of the valve plunger, said frame being formed with a plurality of equally spaced threaded openings having axes parallel to the axis of the valve plunger, screws extending through said openings, a bearing block carried on the end of each screw, a valve operating lever secured to the free end of the plunger and disposed radially with relation to the arcuate frame, and a roller carried by said lever and bearing against the bearing blocks on the ends of the screws, whereby swinging movement of the lever will cause the roller to travel along the cam surface provided by the bearing blocks and will reciprocate the valve plunger.

JOSEPH T. VOORHEIS.